United States Patent [19]

Abraham et al.

[11] Patent Number: 5,231,659
[45] Date of Patent: Jul. 27, 1993

[54] TELEPHONE HANDSET WITH TRANSDUCER ASSEMBLY

[75] Inventors: Denis Abraham, Vanves; Christian Bourel, Taverny; Didier Beauval, Offranville, all of France

[73] Assignee: Alcatel Business Systems, Paris, France

[21] Appl. No.: 896,789

[22] Filed: Jun. 9, 1992

Related U.S. Application Data

[63] Continuation of Ser. No. 523,942, May 16, 1990, abandoned.

[30] Foreign Application Priority Data

May 16, 1989 [FR] France ................... 89 06365

[51] Int. Cl.$^5$ ................... H04M 1/00; H04R 25/00
[52] U.S. Cl. ................... 379/433; 381/150; 381/157; 381/158; 381/173; 379/419; 379/428
[58] Field of Search ............ 379/419, 428, 433, 436; 381/150, 156, 157, 159, 168

[56] References Cited

U.S. PATENT DOCUMENTS

| | | | |
|---|---|---|---|
| 2,404,877 | 7/1946 | Horlacher | 381/150 |
| 4,063,049 | 12/1977 | Pipitore et al. | 381/173 |
| 4,263,484 | 4/1981 | Hisatsune et al. | 381/157 |
| 4,295,009 | 10/1981 | Weidler | 381/205 |
| 4,302,695 | 11/1981 | Boyles et al. | 310/324 |
| 4,594,478 | 6/1986 | Gumb et al. | 381/157 |
| 4,796,288 | 1/1989 | Busche et al. | 379/433 |
| 4,984,268 | 1/1991 | Brown et al. | 379/433 |
| 5,042,071 | 8/1991 | Stinauer et al. | 381/158 |
| 5,081,674 | 1/1992 | Wijus et al. | 379/433 |
| 5,155,773 | 10/1992 | Hansen | 381/194 |

FOREIGN PATENT DOCUMENTS

| | | | |
|---|---|---|---|
| 0085496 | 8/1983 | European Pat. Off. | 379/433 |
| 2119907 | 11/1972 | Fed. Rep. of Germany | 379/433 |
| 2831401 | 1/1980 | Fed. Rep. of Germany | 381/157 |
| 3425176 | 2/1986 | Fed. Rep. of Germany | 379/433 |
| 2219584 | 2/1974 | France | 379/433 |
| 0096093 | 5/1985 | Japan | 381/188 |
| 0212053 | 8/1989 | Japan | 379/433 |
| 2152784 | 8/1985 | United Kingdom | 381/188 |

OTHER PUBLICATIONS

Patent Abstracts of Japan, vol. 11, No. 138 (E-503) [2585] May 2, 1987.

Primary Examiner—Curtis Kuntz
Assistant Examiner—William Cumming
Attorney, Agent, or Firm—Sughrue, Mion, Zinn, Macpeak & Seas

[57] ABSTRACT

The telephone handset is provided with at least one piezoelectric transducer (6, 7). The transducer is received in a housing part (2) which includes fixing means for the transducer and its electrical connection means. The housing part is assembled with at least one other complementary part (1) in order to form the handset shell, and it closes the shell locally. An adaptor sleeve makes it possible to replace the piezoelectric transducer by an electromagnetic transducer.

7 Claims, 6 Drawing Sheets

TELEPHONE HANDSET WITH TRANSDUCER ASSEMBLY

This is a Continuation of Application Ser. No. 07/523,942 filed May 16, 1990. Now abandon.

FIELD OF THE INVENTION

The invention relates to a telephone handset in which at least the receiver transducer is of the piezoelectric type.

BACKGROUND OF THE INVENTION

Telephone handsets usually include two transducers, one of which is used as a microphone for converting sounds into electrical signals, while the other, called the "receiver", performs the opposite conversion of electrical signals into sound waves.

These transducers (which may possibly be identical, particularly if they are of the piezoelectric type), are conventionally contained in individual capsules which are mounted in pairs in telephone handsets.

At present, it is advantageous for economic reasons to associate an electret transducer serving as a microphone with a piezoelectric transducer serving as a receiver in the same telephone handset. It is also commercially desirable for the manufacturer to be able to equip a given handset, on request, with one or other of existing telephone capsules, e.g. to be able to substitute an electrodynamic transducer easily for a piezoelectric transducer, if need be. These various reasons lead manufacturers to simplify handsets and handset assembly in order to obtain competitive cost prices while improving quality and ease of use.

The invention therefore proposes a telephone handset whose structure is made lighter by omitting superfluous members and whose assembly is consequently simplified.

SUMMARY OF THE INVENTION

The proposed telephone handset possesses a shell with a transmitter assembly and a receiver assembly opening out laterally at each of its two ends, each assembly including a transducer, at least one of which is of the piezoelectric disk type (6, 7), each being at least partially received in a part (2) which may be individual or common and which has a bottom through which sounds are transmitted. The housing part is assembled with at least one other, complementary part (1) in order to form the handset shell which it closes from the outside at least locally by being flush therewith or by projecting therefrom.

According to a characteristic of the invention, the housing part includes positioning and fixing means enabling the piezoelectric disk to be held in place internally therein together with its electrical connection members by means of a presser endpiece of a block co-operating with the positioning and fixing means for holding the piezoelectric disk in position.

BRIEF DESCRIPTION OF THE DRAWINGS

The invention, its characteristics, and advantages are described in greater detail in the following description made with reference to the figures listed below.

DESCRIPTION OF THE PREFERRED EMBODIMENTS

Figure 1:
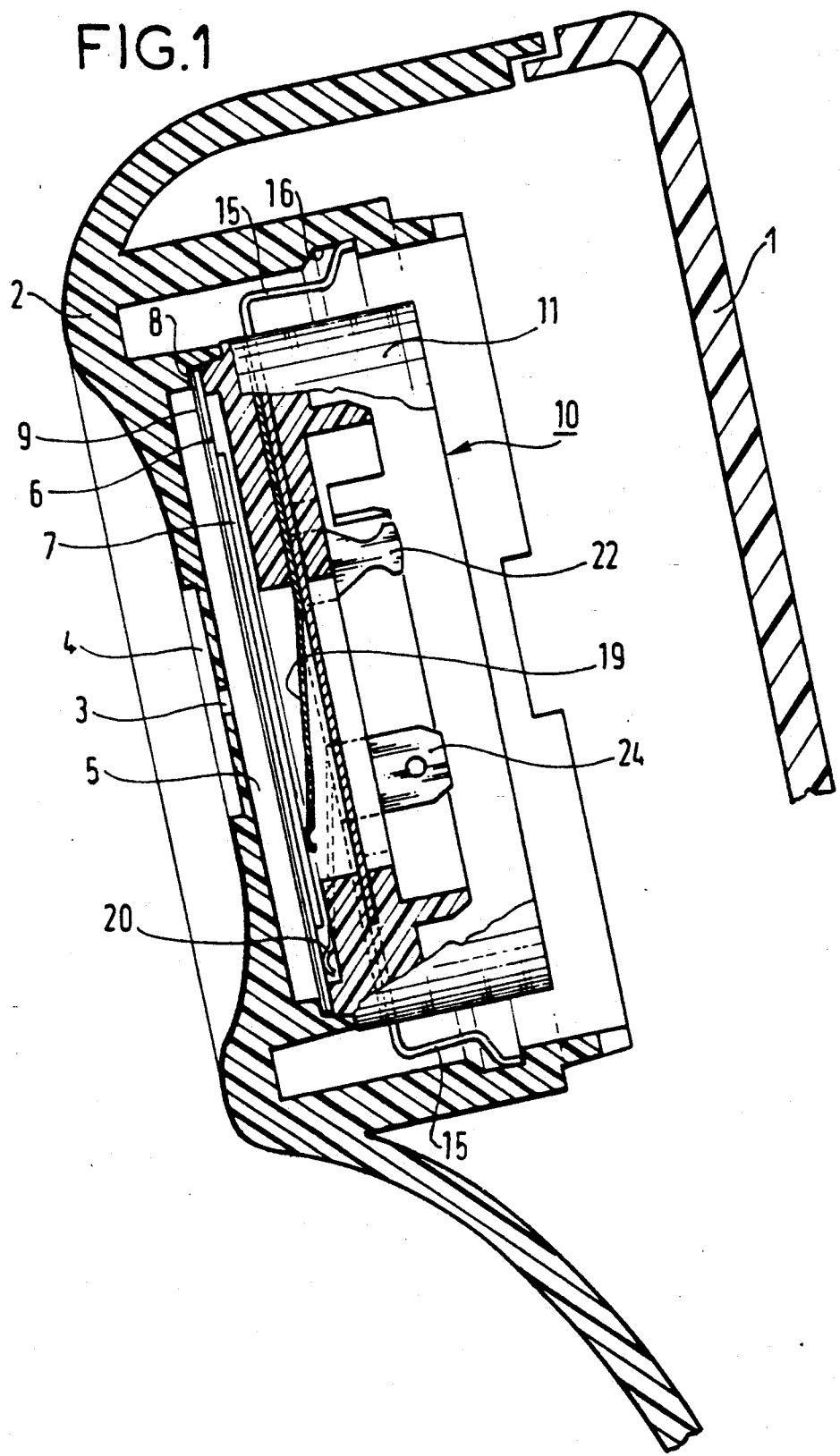
FIG. 1 is a diagram showing the principle of a handset of the invention seen in partially cut-away section.

The telephone handset shown in part in FIG. 1 is assumed to include two transducers, one operating as a microphone and the other as a receiver, with each transducer being incorporated in an individual assembly.

The figure shows only the receiver assembly which includes a piezoelectric transducer, given that the other assembly is mounted identically to the receiver assembly shown here, or else is merely conventional.

The microphone assembly and the receiver assembly of a handset are received on the same side of the handset at opposite ends of a part 1 suitable for being held in the hand, with only one end of the part being shown. The first assembly includes a microphone part for the user to place close to the mouth, while the second assembly is provided with a receiver part which the user presses against the ear. Only the receiver part 2 is shown here, with the corresponding piezoelectric part being analogous thereto.

The microphone part and the receiver part are assembled with at least one other part such as the part 1 in order to form the shell of the handset. This shell is preferably made of one or more rigid insulating materials and it encloses the other component parts of the handset.

In the embodiment shown, the receiver part 2 contains the other components of the receiver assembly and it fits into a housing in the handset shell by closing it. The same may also apply for the microphone part (not shown) of the handset. The various components of the handset shell, including the receiver part and the microphone part may be fixed together by any conventional technique, e.g. snap-fastening, ultrasonic welding, gluing, or even by means of nuts and bolts.

The receiver part 2 is in the form of a box which is at least approximately round in appearance, with the bottom of the box locally closing the handset shell. It is designed to facilitate the transmission of sound to the user and to press comfortably against the ear of the user.

To this end, the bottom of the part 2 is provided on its outside with a central concave recess portion communicating via calibrated openings 3 with the inside of the box formed by said receiver part. These openings are formed in this case in parallel grooves 4 where the wall is of reduced thickness, as can also be seen in FIG. 2 where the grooves are shown in cross-section, with the longitudinal axis of each groove being perpendicular to the plane of the section.

Figure 6:
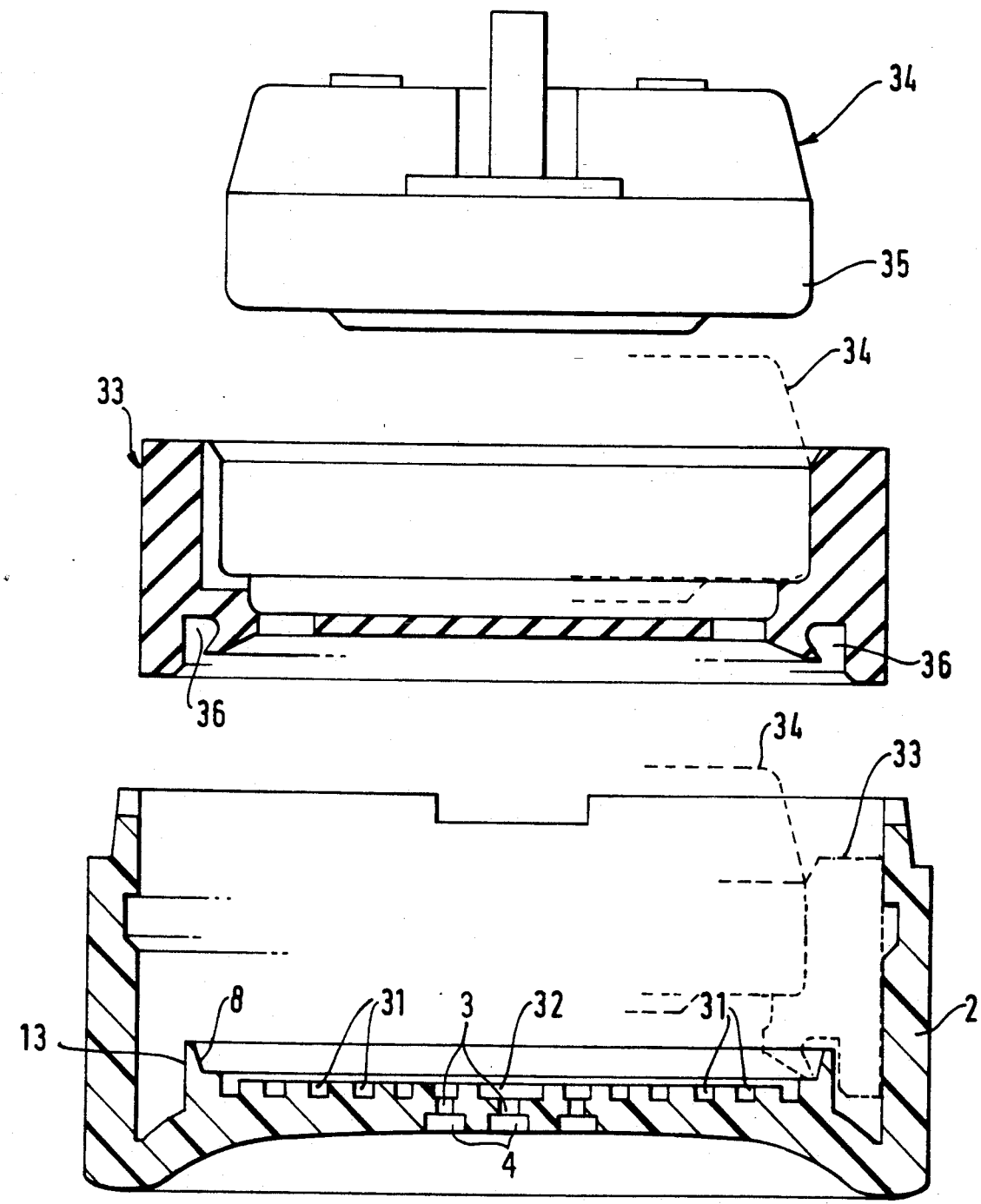
FIG. 6 is an exploded view in section of an assembly of the invention in which an electrodynamic transducer is substituted for a piezoelectric transducer.

The openings 3 open out into the middle of a cylindrical acoustic chamber 5 provided inside the box formed by the part 2 between a transducer disk and a plane inside wall of the box, which wall is pierced by the openings 3 and extends parallel to the disk. In a preferred embodiment shown in FIG. 6, the thickness of the inside wall through which the openings 3 are formed is reduced by concentric circular grooves 31, FIG. 6, provided around a central hole 32 in the inside face of said wall.

The transducer disk (FIGS. 1 and 2) comprises a circular vibrating membrane 6 which is electrically conductive, highly elastic, and suitably stiff so as to be capable of vibrating in response to electrical signals in the telephone band 300 Hz-3000 Hz.

A piezoelectric ceramic wafer 7 has one of its faces pressed against the vibrating membrane in order to form the transducer disk. Its other face is externally covered with an electrically conductive layer.

Figure 2:
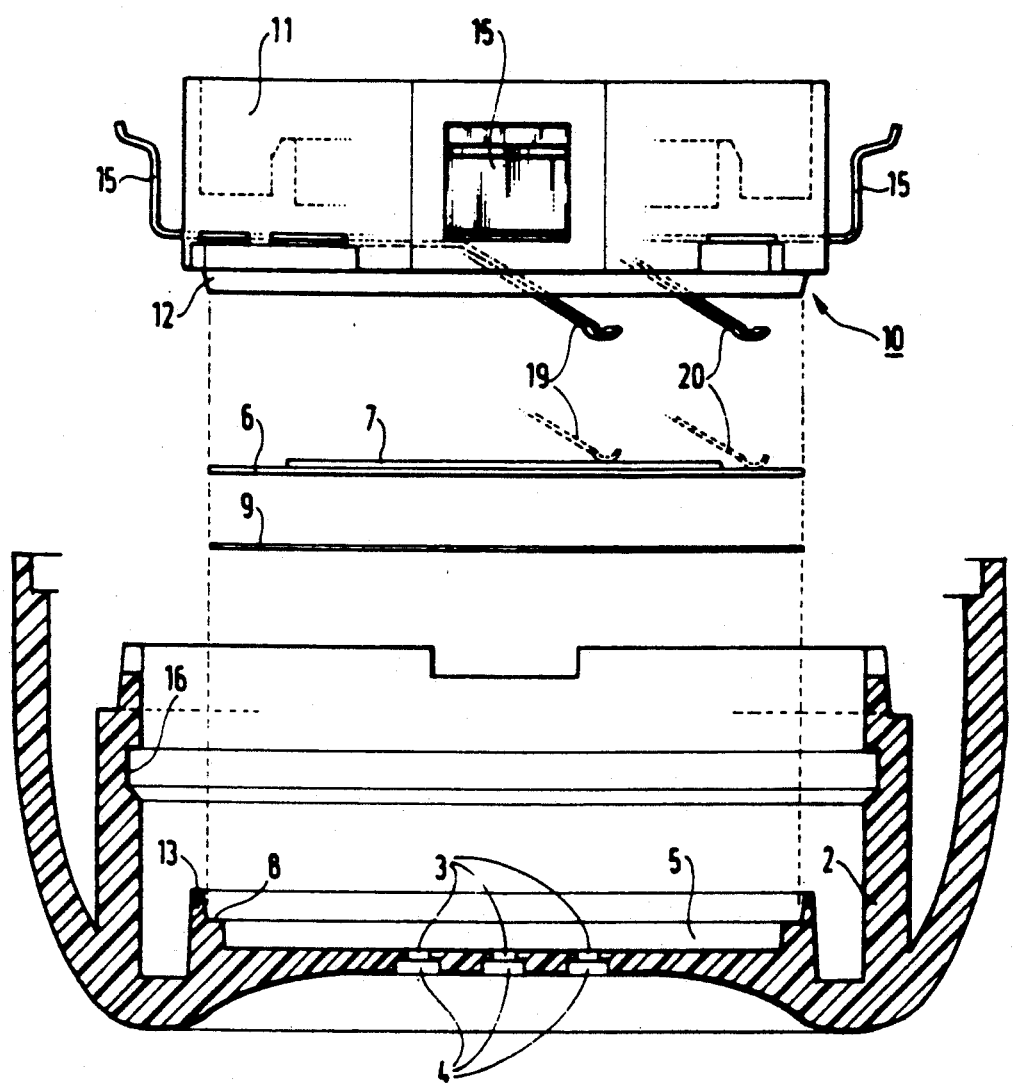
FIG. 2 is an exploded view of a receiver assembly of the invention.

The periphery of the vibrating membrane 6 rests against a self-centering circular bearing surface 8 which is visible in FIG. 2. This bearing surface is provided at the end of the chamber 5 in the part 2 in order to position the vibrating membrane accurately.

A disk 9 of insulating waterproof material is conventionally disposed against the vibrating membrane 6 on the opposite side thereof to the wafer 7 and is interposed in this case between the circular portion 8 and the support membrane 6.

The vibrating membrane 6 is pressed against the circular bearing surface 8 by a mount 10 shown in detail in FIGS. 2 to 5.

Figure 5:
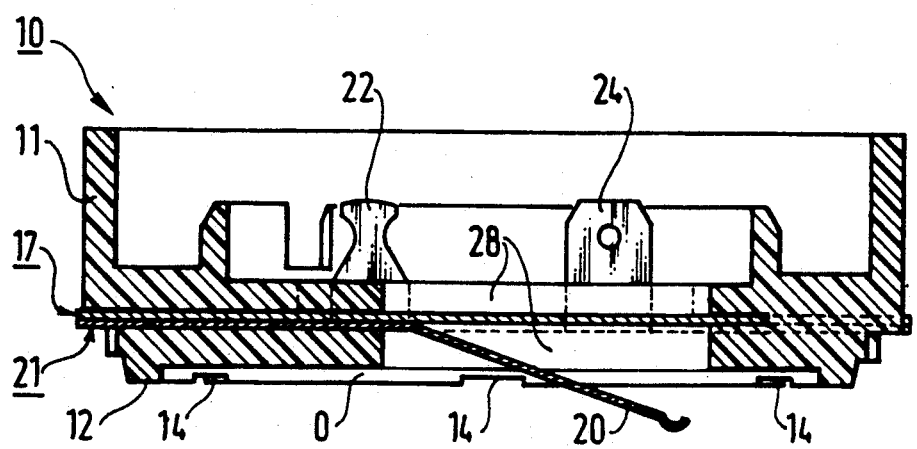

The mount 10 includes a block 11 of insulating material which is cylindrical in appearance and which locks the vibrating membrane 6 and the disk 9 by clamping their peripheries against the circular portion 8 by means of a presser end 12 of block 11 having a frustoconical side wall which is automatically centered in a complementary frustoconical housing opening in a cylindrical rim 13 surrounding the circular bearing surface 8 of the part 2 (see FIGS. 2 and 5).

The presser end 12 which presses against the vibrating membrane forms a ring which is radially interrupted by grooves 14 providing acoustic leakage to a rear acoustic chamber 0 provided in this case in the center of the end in accordance with the conventional technique (FIG. 5).

The block 11 is held in place pressing against the periphery of the vibrating membrane 6 under the action of resilient, spring metal latching tabs 15 which engage in an internal annular groove 16 of the part 2, said groove being parallel to the bearing surface 8 so as to urge the block 11 towards the chamber 5.

Figure 3:
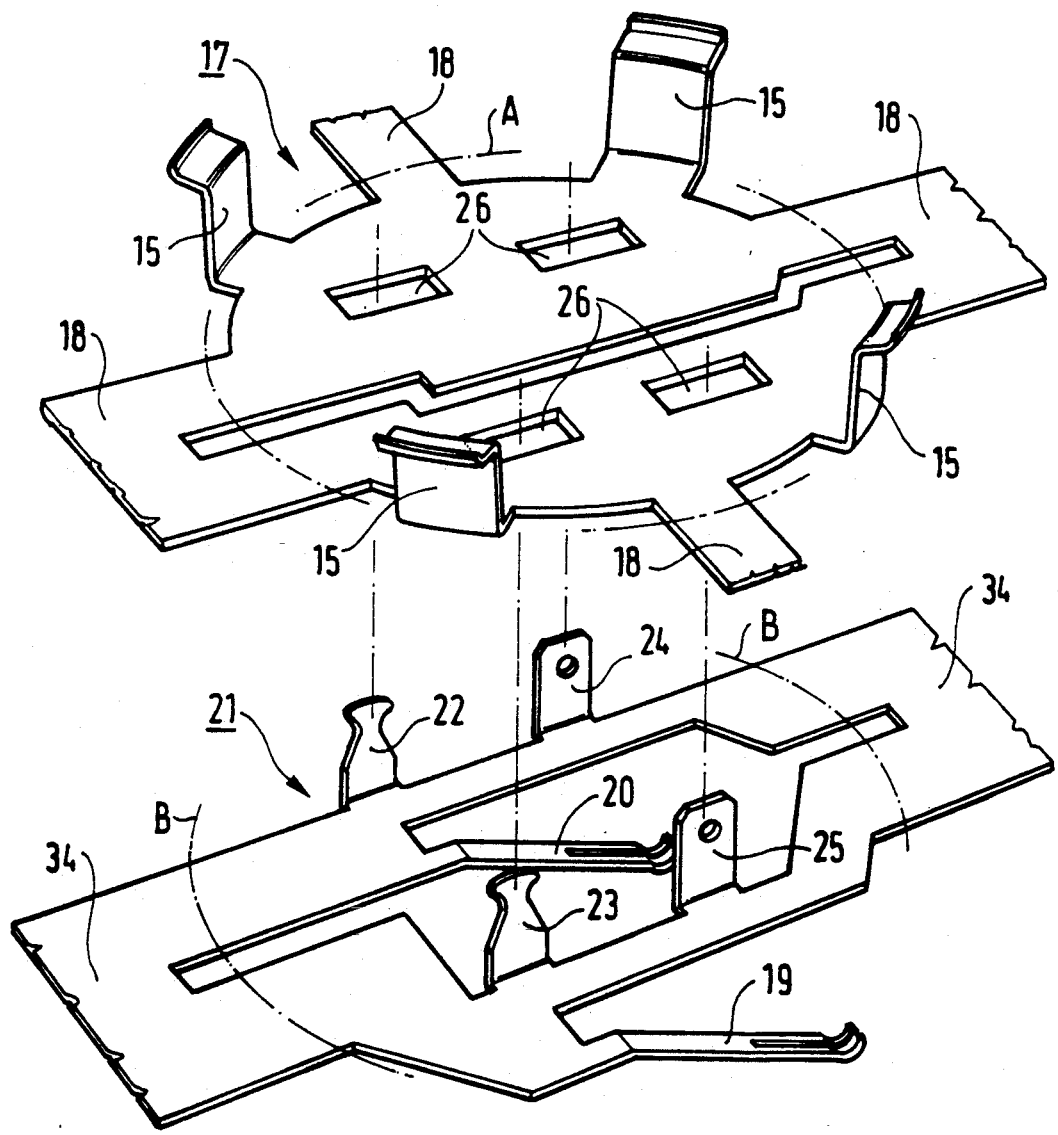
FIG. 3 is an exploded perspective view of the connection and assembly parts of the assembly shown in FIG. 2.
Figure 4:
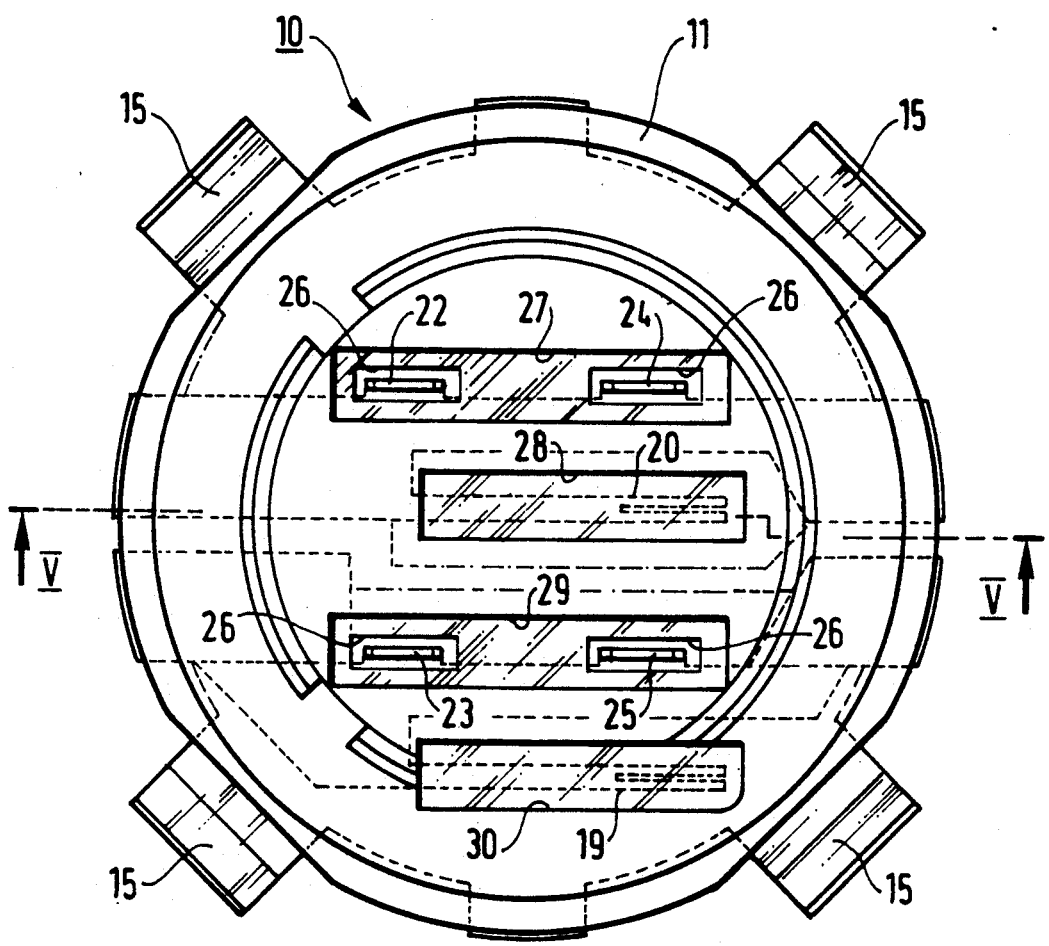
FIGS. 4 and 5 are respectively a plan view and a cross-section of a connection and fixing mount for a handset of the invention.

In the embodiment shown, four latching tabs 15 made of spring metal are formed simultaneously from a plane blank which is previously cut and folded so as to form a cruciform part 17 shown in FIG. 3. A insulating material block 11 capable of setting is overmolded on the part 17, FIG. 7, by means of a mold (not shown), thereby accurately positioning the various tabs 15 since a portion of each of them remains embedded in the block 11 molded in this way.

The relative positioning of the tabs 15 is initially provided by portions 18 of the cruciform part 17 which are shown outside a dot-dashed circle A in FIG. 3 and which are removed after the molding operation, once the tabs are held in place by the material that has set to form the block 11.

In the embodiment shown, inserting the block 11 into the open box formed by the part 2 causes the spring blades constituting the tabs 15 to be urged inwards with the free ends of the tabs rubbing against the inside wall of the box until they are free to splay resiliently outwards into the annular groove 16. The end of each tab 15 then latches against the wall of the annular groove 16 urging the block 11 towards the bottom of the box to press against the bearing surface 8 via the vibrating membrane 6.

The vibrating membrane 6 and the piezoelectric wafer 7 have voltage selectively applied thereto, or more precisely, they are electrically connected by means of two contacts 19 and 20 respectively made in the form of independent resilient tabs, one of which bears against the wafer at a distance from the membrane and the other of which bears against the membrane at a distance from the wafer, as can be seen in FIG. 1 where the positions of contacts 19 and 20 on the transducer disk are shown in dashed lines.

In the embodiment proposed, the contacts 19 and 20 are made by cutting out and folding a blank of conductive metal which is initially in the form of a single conductive part 21 which is pressed against the part 17 prior to the block 11 being molded thereover. The folding is performed in such a manner that the contacts 19, 20 project obliquely in the form of tabs beyond the presser end 12 when the block 11 is in place, said contacts then making electrical contact respectively with the vibrating membrane 6 and with the wafer 7.

Prior to overmolding, the part 21 is positioned relative to the part 17 by four extensions 22, 23, 24, and 25 projecting away from the blank 21 at right angles from the face opposite to that from which the contacts 19 and 20 project, said extensions penetrating into four corresponding holes 26 in the part 17. Portions 34 lying outside a dot-dashed circle B in FIG. 3 are cut off after the block 11 has been molded over the touching parts 17 and 21. Cutting off the parts 18 and 34 after molding, eliminates the electrical connections constituted by said parts between the extensions 22 and 24 or the contact 20 and the extensions 23 and 25 or the contact 19. In this context, it should be observed that FIG. 1 is a diagram for illustrating principles and it does not show the exact relative positions of the tabs 15 and the contacts 19 and 20.

In the embodiment shown, the extensions 24 and 25 projecting outside the block 11 in the opposite direction to the presser end 12 are shaped to receive wire connections, e.g. by means of Faston type connectors, while the extensions 22 and 23 are designed to receive connection wires directly, e.g. for a conventional coil (not shown) intended to establish an electromagnetic field for use by the hearing aid of a partially deaf user and responding to speech signals received from the telephone line via the terminals 24 and 25.

As mentioned in the description, the block 11 is molded over the parts 17 and 21 and the portions 18 and 34 thereof are removed after molding so as to obtain a body which is cylindrical in appearance in the embodiment proposed and from which the contacts 19 and 20 project via a face which also forms a presser end 12. The other face of the block is hollow and its bottom includes parallel slots 27, 28, 29, and 30.

The slots 27 and 29 serve to enable the extensions 22, 24 and 23, 25 to project from the other face into the cavity obtained in the hollow.

As a result, the provision of a part 2 for a handset receiver or microphone is simplified.

The box of a part 2, the molding of the block 11 on the parts 17 and 21, and the cutting off of the portions 18 and 34 from said parts take place in isolation, after which it merely remains to stack the disk 9, the transducer disk 6-7, and the block 11 in the cavity of the box in the part 2, in an appropriate central position, and to snap-fasten the tabs 15 in the annular groove 16 in order to obtain an assembly.

The contacts 19 and 20 are positioned so that one of them is close to the periphery of the vibrating membrane 6 while the other lies over the central zone of the wafer which is coaxial with said vibrating membrane. Providing the transducer disk 6-7 is properly placed on its bearing surface and the presser end 12 is inserted in the frustoconical portion 13 to bear against the disk positioning is ensured and there is no particular constraint on the annular portion thereof in a transverse plane.

After the electrical connection wires of the handset have been connected to the extensions 24 and 25, in particular, handset assembly consists merely in assembling the, or each, part 2 with the complementary part(s) of the housing by appropriate positioning and snap-fastening.

Figure 7:
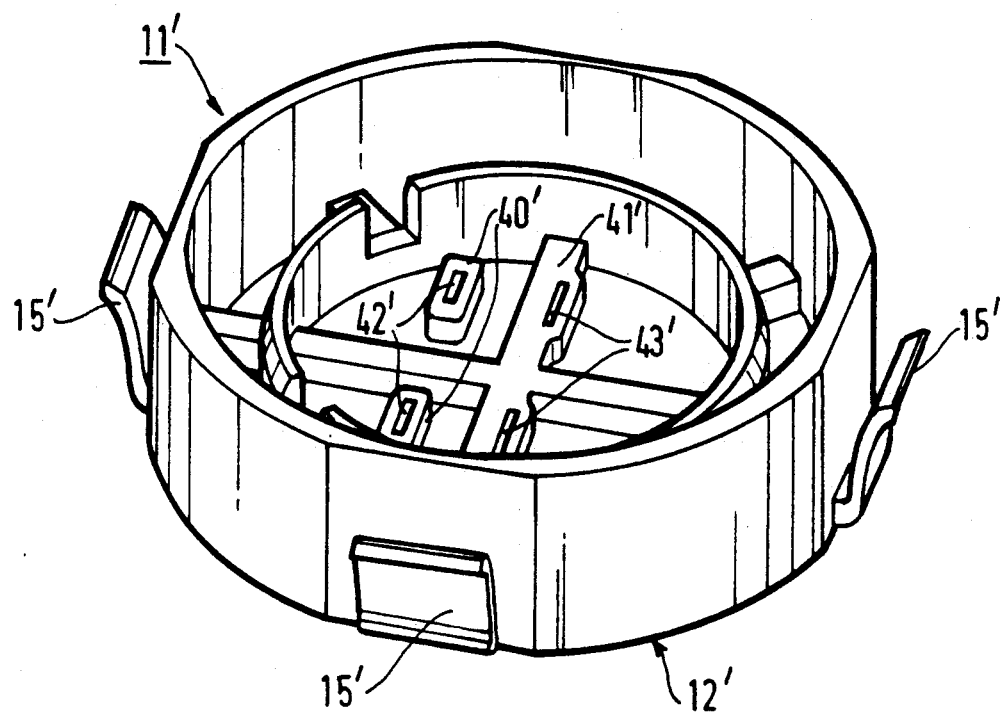
FIGS. 7 and 8 are perspective views of the component parts of a variant fixing and connection mount suitable for being substituted for that shown in FIGS. 4 and 5.
Figure 8:
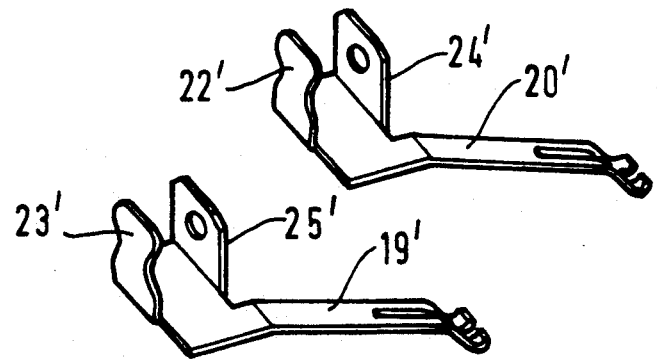

In a preferred embodiment of the invention, the mount 10 comprising the block 11, the latching tabs 15, and the contact tabs 19 and 20 is replaced in a housing part 2 of a handset by an alternative mount whose component parts are shown in FIGS. 7 and 8.

The mount comprises a block 11' which is hollow, made of molded material, and intended to replace the block 11. The block 11' has a presser end 12' which is at least analogous to if not identical with the presser end 12 and which performs the same functions relative to the piezoelectric disk 6, 7 in co-operation with the housing part 2 in which it is inserted.

The generally cylindrical block 11' includes semi-resiliently latching tabs 15' integrally molded therewith. These latching tabs 15' are intended to position the block 11' in the housing part 2 and to hold the periphery of the piezoelectric disk 6, 7 in place, with the free end of each of the tabs engaging, in the grooves 16, for this purpose. Alternatively, a plurality of notches may be provided in the housing part 2 for receiving respective ones of the latching tabs 15' of the block 11'.

In this case, the contact tabs 19' and 20' made of a resilient electrically conductive material are made separately from the block 11', and they are held in place therein in molded elements 40' and 41' of the block. These elements 40' and 41' are provided in the bottom of the block and enable the contact tabs to project in front of the presser end 12' so as to bear against conducting contact portions of the membrane 6 and of the wafer 7 of the piezoelectric disk when the block and the disk are in place.

Openings provided through the shapes 40' and 41' serve to enable extensions 22', 23', 24', and 25' of the contact tabs 19' and 20' to pass therethrough, which extensions correspond functionally to the extensions 22, 23, 24, and 25 for the purpose of connection to electrical connection connectors or wires.

The assembly shown in FIG. 6 is intended to enable a piezoelectric transducer as described above to be replaced by a conventional electrodynamic transducer, if the need arises.

To this end, an adaptor sleeve 33 which is generally cylindrical in shape is made of elastomer material and is positioned in the housing part 2 where a conventional electrodynamic telephone capsule 34 is to be placed with its sound transmission face being disposed at the end of a cylindrical portion 35.

One of the large faces of the adapter sleeve 33 fits over the sound transmission face of the capsule 34 and extends round the cylindrical portion 35, with the assembled position being shown in dashed lines in the middle of FIG. 6.

The other large face of the adaptor sleeve 33 is engaged in the housing part 2 relative to the self-centering bearing surface 8 against which it presses.

In a preferred embodiment, the sleeve is provided with a circular groove 34 in said other large face which fits over the cylindrical projection 13 as it comes into position against the circular bearing surface 8, with the groove engaging the inside and outside walls of the projection 13, as can be seen in dashed lines in the bottom of FIG. 6 where the capsule is shown in its mounted position.

The capsule 34 is then partially held in place by pressure from the sleeve wedged against the capsule 34 and inside cylindrical wall of the housing part.

We claim:

1. In a telephone handset having an outside, and a transducer assembly at one end of the handset, said transducer assembly including a piezoelectric disk transducer, and said transducer assembly being at least partially housed in a handset housing part (2) with sound being transmitted through a bottom thereof, said handset housing part being assembled with at least one other complementary part (1) to form a handset shell closed from the outside, the improvement wherein; said handset housing part (2) includes positioning means and fixing means (13, 16) for holding a piezoelectric disk and electrical connection members (19, 19') thereof in place in said handset housing part by a presser (12, 12') of a block (11, 11') engaging said handset housing part and fixing means (15, 16) for holding the piezoelectric disk in position, wherein the handset housing part (2) comprises a box having an inside and including a self-centering circular bearing surface (8) on the inside thereof situated close to the said bottom, openings perforating said bottom for transmitting sound and receiving an outside edge of the piezoelectric disk which is peripherally held in position by said presser end (12, 12') of said block (11, 11'), said block is centered within a hollow, frustoconical housing recess within a rim (13) surrounding the circular bearing surface (9) and being accurately positioned therein, and wherein the presser end (12) is provided on one face of said block (11) which block is made of insulating material and which block is molded over an embedded portion of resilient latching tabs (15), said tabs projecting sideways from the block and engaging said handset housing part, and said block being further molded over an embedded portion of resilient contact tabs (19, 20) projecting from the presser end and bearing against respective component parts of said piezoelectric disk constituted by a piezoelectric wafer (7) and by a vibrating member (6) of said disk.

2. A telephone handset according to claim 1, wherein the presser end (12) is provided on one face of said hollow block (11') of molded insulating material including said resilient latching tabs (15') for holding said block in the housing part (2) by engaging recess portions (16) of said housing part, and orifices passing and fixing resilient contact tabs projecting from the presser end and bearing against respective component parts of the piezoelectric disk constituted by said piezoelectric wafer (7) and by said vibrating membrane (6) of said disk.

3. A telephone handset according to claim 1, wherein the embedded portions of the latching tabs (15) and the resilient contact tabs extend from two parts which are pressed against each other and in electrical contact with said black being molded thereover, and wherein the parts are cut off at the margin of the block after molding in order to insulate the electrical tabs electrically from each other.

4. A telephone handset according to claim 1, wherein the resilient contact tabs project from the presser end (12 or 12') of said block (11 or 11') towards the transducer disk (6, 7) and are constituted by individual connection extensions (22 to 25, 22' to 25') which extend from portions of said tabs, said tabs are fixed in the block and project into a cavity of the block situated at opposite sides of the block relative to the portions of said tabs making contact with the piezoelectric disk.

5. A telephone handset according to claim 1, further comprising an electrodynamic capsule (34) and an adaptor sleeve (33) positioning said electrodynamic capsule (34) in the handset housing part instead of said piezoelectric disk transducer.

6. A telephone handset according to claim 5, wherein the adaptor sleeve (33) engages said circular bearing surface (8) of the housing part (2) in which said sleeve is situated for the purpose of positioning the sleeve in the handset.

7. A telephone handset according to claim 6 wherein said adaptor sleeve (33) is an elastomer sleeve, said adaptor sleeve is provided with a circular groove (36) in a first one of plural faces of taking up a position inside the circular bearing surface (8) of the handset housing part (2) while surrounding said rim (13) in which said bearing surface is formed, and said adaptor sleeve receives said electrodynamic capsule via a second one of said plural faces.

* * * * *